US006766390B2

United States Patent

(12) United States Patent
Komiya et al.
(10) Patent No.: US 6,766,390 B2
(45) Date of Patent: Jul. 20, 2004

(54) INTER-SYSTEM CONNECTION ADAPTER AND TERMINAL

(75) Inventors: Noriyuki Komiya, Tokyo (JP); Noriyuki Kushiro, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/296,807

(22) PCT Filed: Mar. 29, 2001

(86) PCT No.: PCT/JP01/02665

§ 371 (c)(1), (2), (4) Date: Nov. 27, 2002

(87) PCT Pub. No.: WO02/080466

PCT Pub. Date: Oct. 10, 2002

(65) Prior Publication Data

US 2003/0114050 A1 Jun. 19, 2003

(51) Int. Cl.$^{7}$ ................................................ G06F 13/12

(52) U.S. Cl. ............................... 710/62; 710/5; 710/30; 710/52; 710/105; 712/225; 370/335

(58) Field of Search ............................ 710/1, 5, 18, 30, 710/33, 39, 52, 54, 62, 63, 105, 106, 112; 712/225; 370/384, 335, 245

(56) References Cited

U.S. PATENT DOCUMENTS 5,349,583 A * 9/1994 Christensen et al. ........ 370/434
5,568,471 A * 10/1996 Hershey et al. ............. 370/245
5,771,232 A * 6/1998 Sinibaldi et al. ............ 370/384
6,404,752 B1 * 6/2002 Allen et al. ................. 370/335
6,553,028 B1 * 4/2003 Tang et al. ................. 370/389

FOREIGN PATENT DOCUMENTS

| | | |
|---|---|---|
| JP | 7-212405 | 8/1995 |
| JP | 11-187061 | 7/1999 |
| JP | 2000-244551 | 9/2000 |

OTHER PUBLICATIONS

"LonWorks, Bringing the Internet to Life," Mar. 24, 2000, Issue No. 6, Echelon Japan Co., Tokyo, Japan (with partial translation).

* cited by examiner

*Primary Examiner*—Rehana Perveen
*Assistant Examiner*—Rijue Mai
(74) *Attorney, Agent, or Firm*—Burns, Doane, Swecker & Mathis, L.L.P.

(57) ABSTRACT

The present invention is to provide a system connection adapter and a terminal device, which allow a function which is newly developed and added by a maker on a system A to be handled on an open system B even in the case where the system A which is an existing system for supervising and controlling such as an air conditioning apparatus and a lighting apparatus installed in a building or at home is connected with the open system B which is made up by using a protocol different from that used by the system A. This allows for ease in expanding functions. According to the system connection adapter, a conventional command, which is the original of the system A, and therefore not specified in the open system B and has no correspondence available, is added with a frame header B by a frame encapsulation and decapsulation means, and transmitted in its original form. Then, the terminal device connected on the system B is provided with the function of extracting a command A 104 from a frame B transmitted, and interpreting the command A to be processed.

2 Claims, 5 Drawing Sheets

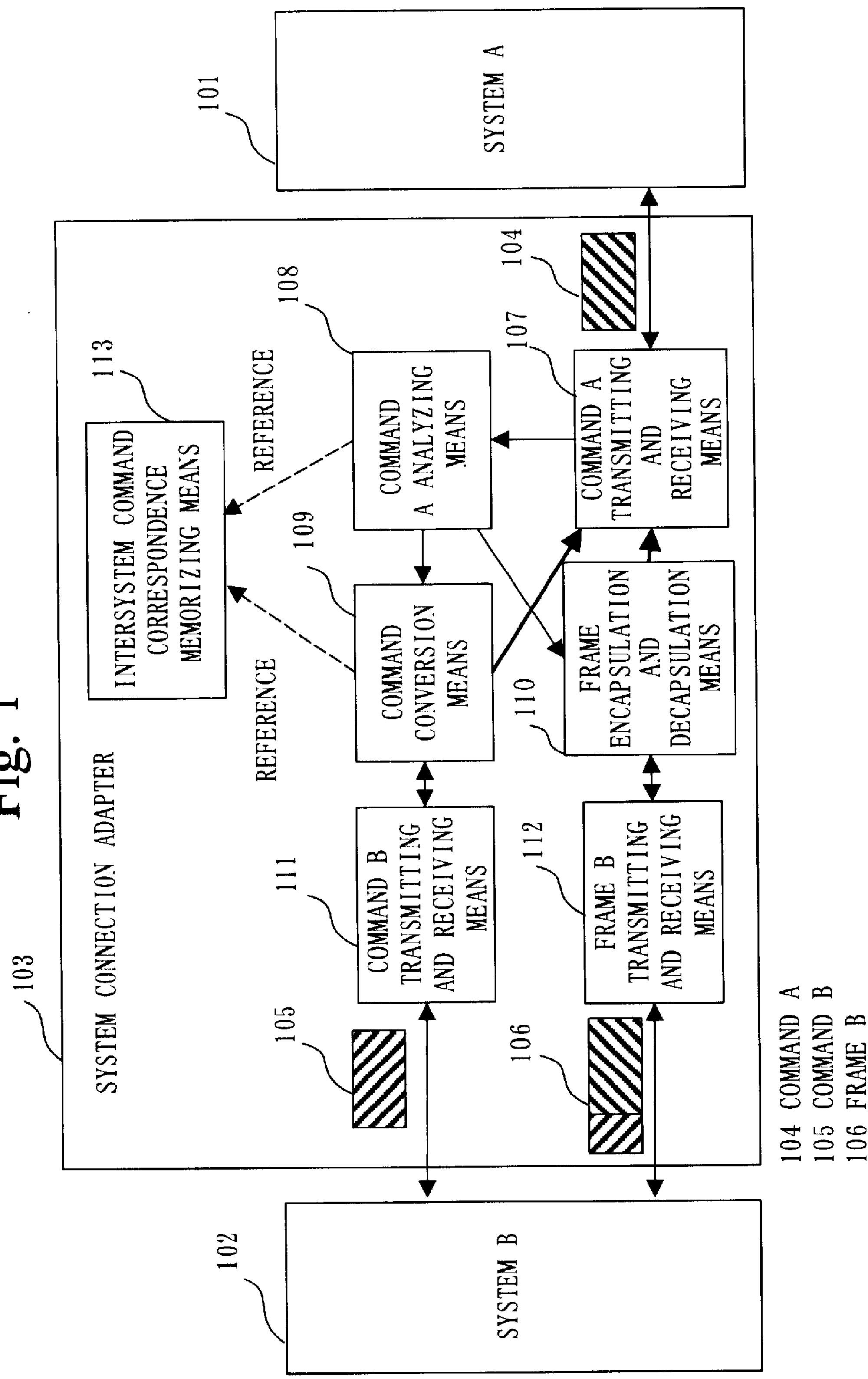
Fig. 1
SYSTEM A
101
SYSTEM B
102
SYSTEM CONNECTION ADAPTER
103
104
105
106
COMMAND A TRANSMITTING AND RECEIVING MEANS
107
COMMAND A ANALYZING MEANS
108
COMMAND CONVERSION MEANS
109
FRAME ENCAPSULATION AND DECAPSULATION MEANS
110
COMMAND B TRANSMITTING AND RECEIVING MEANS
111
FRAME B TRANSMITTING AND RECEIVING MEANS
112
INTERSYSTEM COMMAND CORRESPONDENCE MEMORIZING MEANS
113
REFERENCE
REFERENCE
104 COMMAND A
105 COMMAND B
106 FRAME B (a) ENCAPSULATION
104
301
ADD FRAME HEADER B
106
301 FRAME HEADER B
(b) DECAPSULATION
106
301
REMOVE FRAME HEADER B
104

503
EXISTING SYSTEM X
503
EXISTING SYSTEM Y
502
SYSTEM CONNECTION ADAPTER X
502
SYSTEM CONNECTION ADAPTER Y
501
OPEN SYSTEM
(b)
503
EXISTING SYSTEM X
503
EXISTING SYSTEM Y
502
SYSTEM CONNECTION ADAPTER
501
OPEN SYSTEM
(c)
503
EXISTING SYSTEM X
503
EXISTING SYSTEM Y
502
SYSTEM CONNECTION ADAPTER
501
OPEN SYSTEM X
501
OPEN SYSTEM Y

INTER-SYSTEM CONNECTION ADAPTER AND TERMINAL

TECHNICAL FIELD

The present invention relates to a system connection adapter and a terminal device for connecting a system for supervising and controlling such as an air conditioning apparatus and a lighting apparatus which are installed in a building or at home, for example, to an open system which is made up by using a protocol different from that used by the system for supervising and controlling.

BACKGROUND ART

Conventionally, a network management system, which supervises and controls such as an air conditioning apparatus and a lighting apparatus installed in such as a building, is making up its own original network system. For that reason, the conventional network management system is not allowed to be interconnected with other systems.

In recent years, however, there is a rising demand of making up a low cost and highly efficient system by unifying the standards of network systems, thereby allowing various devices and open systems to be selected freely depending on the purposes, and by interconnecting the systems.

Under such circumstances, a problem has been posed with devices which are connectable only with maker's original network systems. Those devices are not operable with open systems, which causes trouble to the sales performance.

In order to solve such a problem, Unexamined Patent Publication No. Hei7-212405, for example, has proposed a method of building an integrated heterogeneous multi-protocol network through connection of single protocol networks of different kinds from each other by means of a gateway which provides transparent interconnection.

When such a connection method is used, there is a merit of allowing the devices and systems of different makers to be connected with each other. To the contrary, however, it is becoming difficult for a maker to establish predominance with its original function being developed and added.

Besides, another problem has been posed of handling an original function which is not specified in open systems.

The present invention is directed to solving those problems discussed above. It is an object of the present invention to provide a system connection adapter and a terminal device which allow for ease in developing a system product having an additional function which is maker's original and thereby predominant over those of other companies, and also allow for ease in expanding functions.

DISCLOSURE OF THE INVENTION

A system connection adapter according to the present invention may includes a command A transmitting and receiving means which transmits and receives a command A relating to a system A, a command B transmitting and receiving means which transmits and receives a command B relating to a system B which is made up by using a protocol different from a protocol used by the system A, a frame B transmitting and receiving means which transmits and receives a communication frame B relating to the system B, an intersystem command correspondence memorizing means which memorizes correspondence relation between the command A and the command B, a command A analyzing means which analyzes the command A from the command A transmitting and receiving means, and judges, with reference to the intersystem command correspondence memorizing means, whether to establish a correspondence between the command A and the command B, a command conversion means which establishes, with reference to either one of a judgement result by the command A analyzing means and the intersystem command correspondence memorizing means, the correspondence between the command A from the command A transmitting and receiving means and the command B from the command B transmitting and receiving means, and converts the command A and the command B from one to the other so as to mediate transmission and reception between the command B transmitting and receiving means and the command A transmitting and receiving means, and a frame encapsulation and decapsulation means which performs one of encapsulation and decapsulation, with reference to the judgement result by the command A analyzing means, of the communication frame B from the frame B transmitting and receiving means and the command A from the command A transmitting and receiving means so as to mediate transmission and reception between the frame B transmitting and receiving means and the command A transmitting and receiving means.

A terminal device according to the present invention may be connected to a system B in a system which is provided with a system A, the system B and a connection adapter, the system B being made up by using a protocol different from that used by the system A, and the connection adapter performing one of converting a command A relating to the system A and a command B relating to the system B from one to the other and exchanging the command A and the command B by means of encapsulating the command A in a frame B relating to the system B and extracting the command A encapsulated from the frame B. The terminal device may include a command B transmitting and receiving means, which transmits and receives the command B to and from the connection adapter, a command B processing section, which performs one of interpreting the command B and generating the command B and transmits and receives the command B to and from the command B transmitting and receiving means, a frame B transmitting and receiving means, which transmits and receives the frame B to and from the connection adapter, an encapsulation and decapsulation means, which performs one of encapsulating the command A into the frame B and decapsulating the frame B to extract the command A and transmits and receives the frame B to and from the frame B transmitting and receiving means; and a command A processing section, which performs one of interpreting the command A and generating the command A and transmits and receives the command A to and from the encapsulation and decapsulation means.

BRIEF DESCRIPTION OF THE DRAWINGS

FIG. 1 is a block diagram of a system connection adapter according to a first embodiment of the present invention;

BEST MODE FOR CARRYING OUT THE INVENTION

Embodiment 1.

A system connection adapter according to a first embodiment of the present invention is now discussed.

Figure 2:
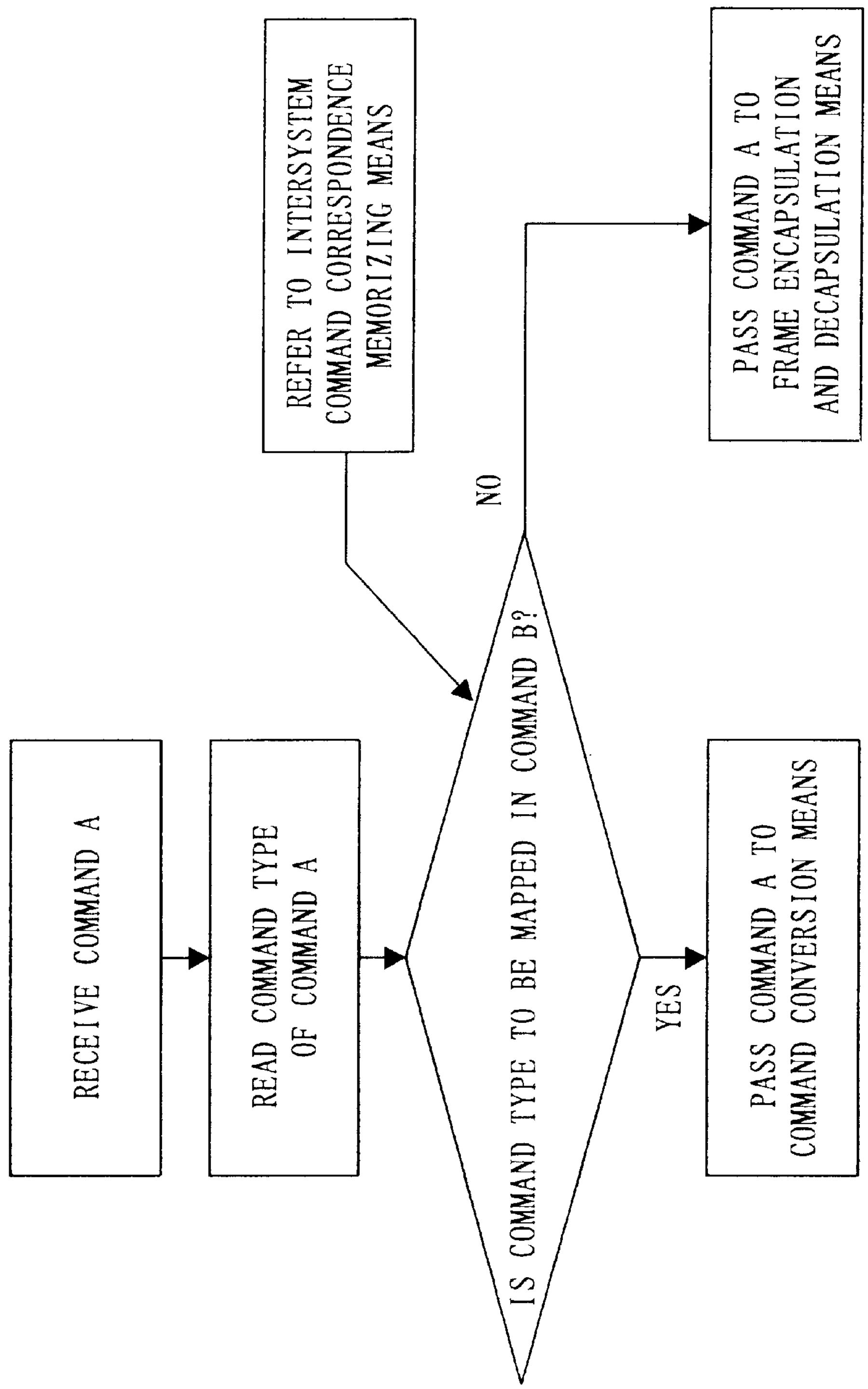
FIG. 2 is a flow chart illustrating an processing procedure of a command A analyzing means according to the first embodiment of the present invention.
Figure 3:
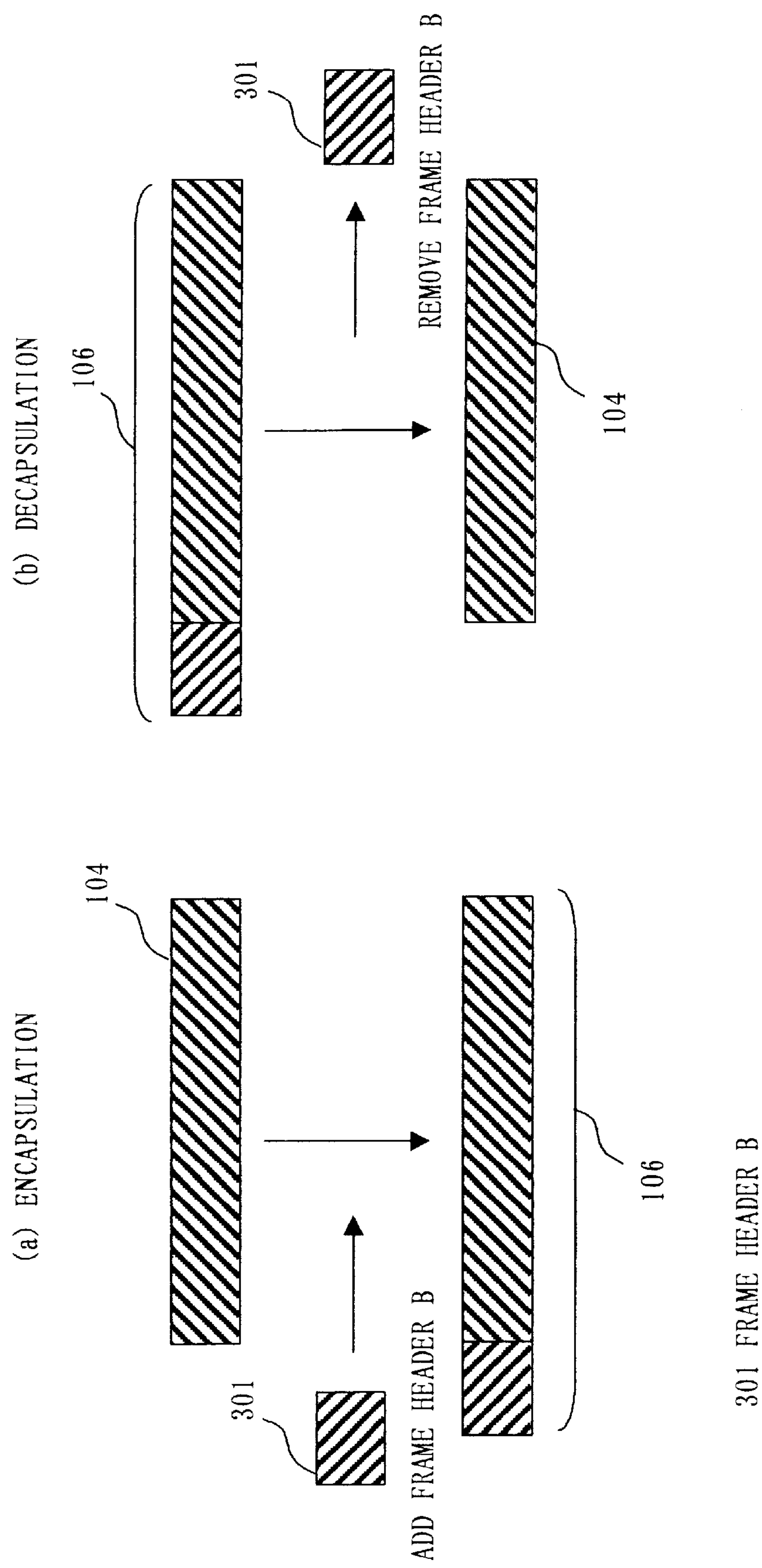
FIG. 3 shows simplified explanatory diagrams illustrating encapsulation (a) and decapsulation (b) of a communication frame corresponding, respectively, to adding a header and removing the header.
Figure 4:
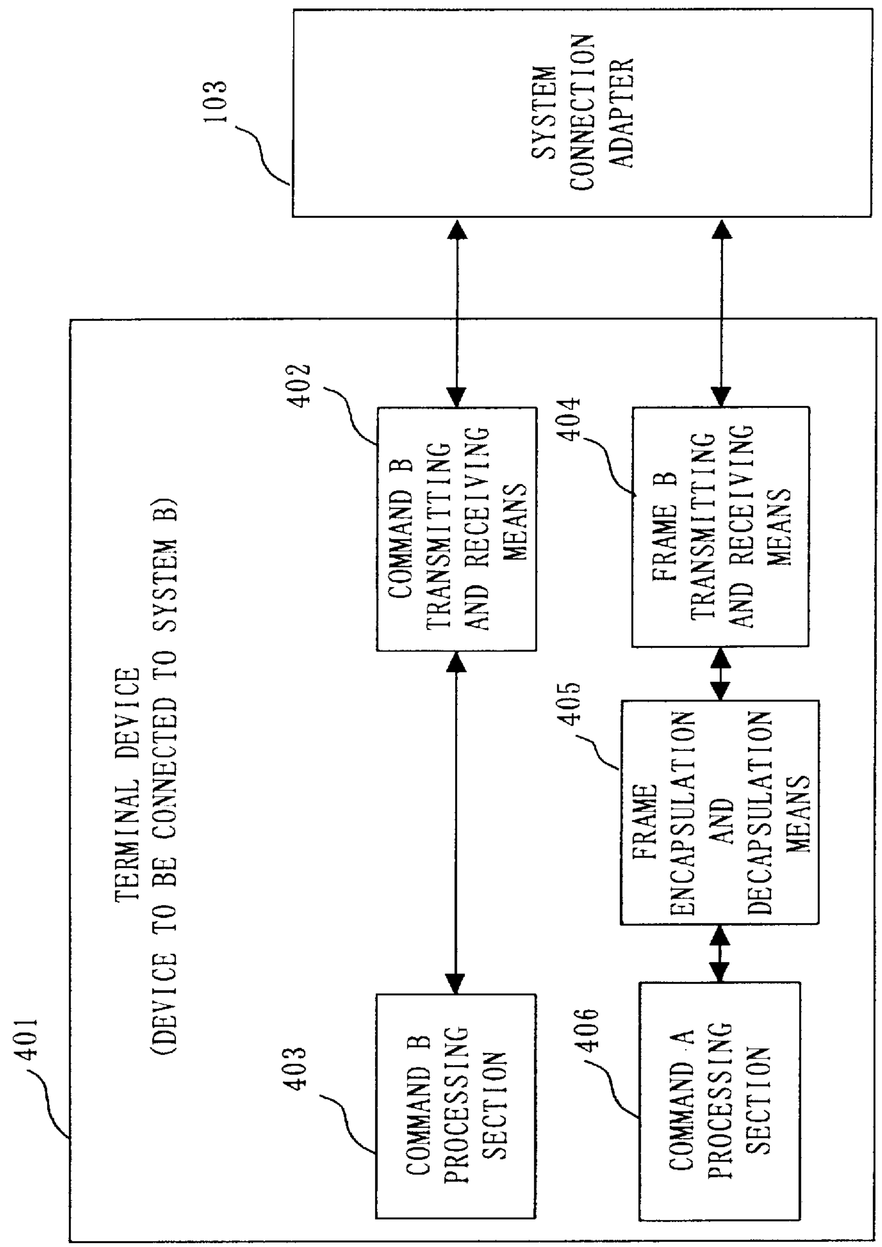
FIG. 4 is a block diagram of a device connected on the side of System B.
Figure 5:
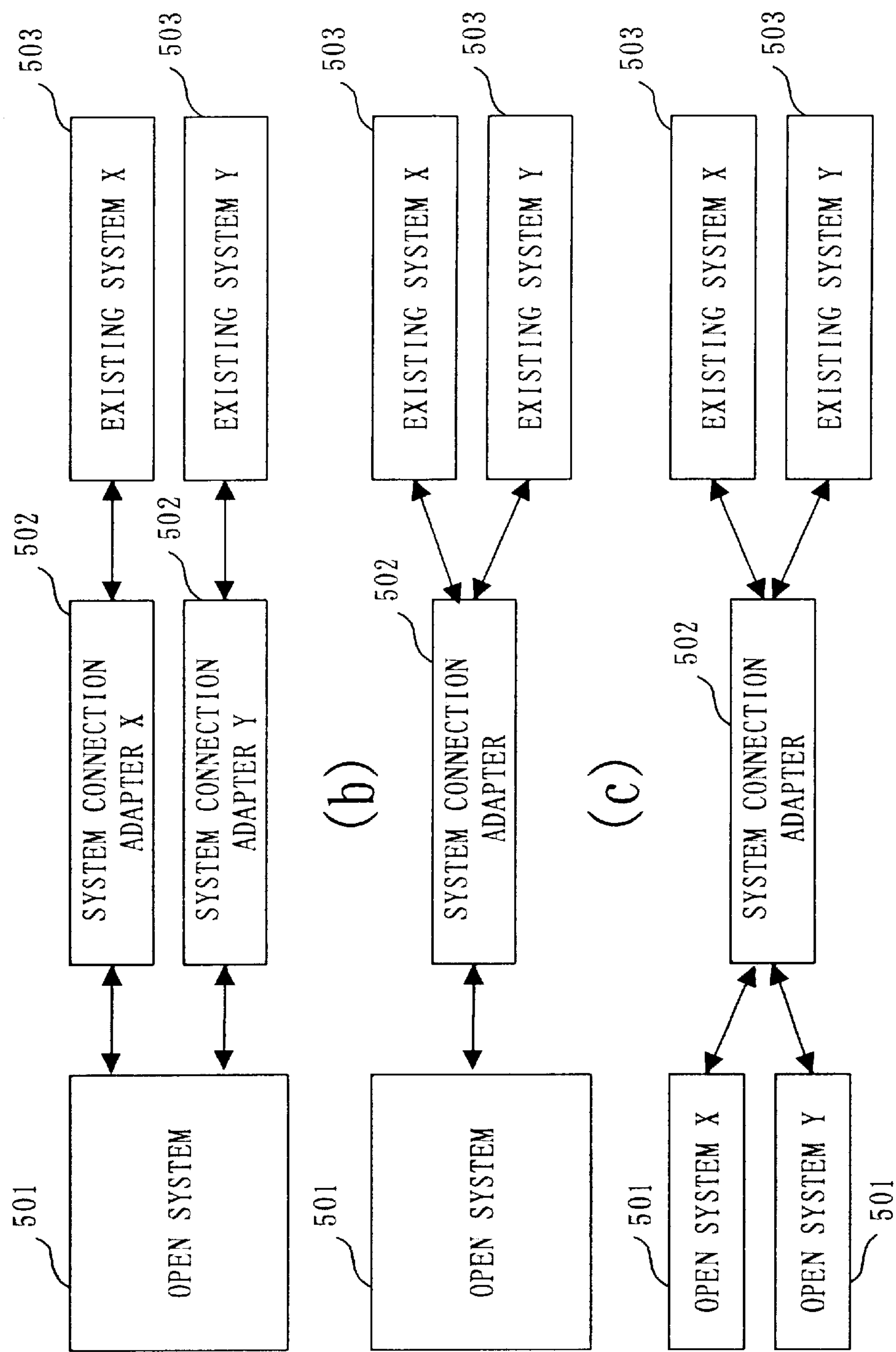
FIG. 5 shows explanatory diagrams of connection modes (a), (b) and (c) between an open system or open systems and existing systems by means of the system connection adapter or adapters according to the first embodiment of the present invention.

FIG. 1 and FIG. 2 show a block diagram of the system connection adapter according to the present invention and a flow chart illustrating a processing procedure of a command A analyzing means, respectively. FIGS. 3(*a*) and (*b*) are simplified explanatory diagrams illustrating encapsulation and decapsulation of a communication frame corresponding, respectively, to adding and removing a header. FIG. 4 is a block diagram of a device which is connected on the side of System B. FIGS. 5(*a*), (*b*), and (*c*) are explanatory diagrams illustrating modes, in each of which an open system is or open systems are connected with conventional systems by means of the system connection adapter or system connection adapters according to the first embodiment of the present invention.

With referring to FIG. 1, a reference numeral 101 denotes an existing system (which will be referred to hereinafter as System A), which supervises and controls such as an air conditioning apparatus and a lighting apparatus in a building or at home. A reference numeral 102 denotes an open standard system (which will be referred to hereinafter as System B), which is made up by using a protocol which is different from that used by System A 101. A reference numeral 103 denotes a system connection adapter for connecting System A 101 and System B 102. A reference numeral 104 denotes a command corresponding to System A 101 (which will be referred to hereinafter as Command A). A reference numeral 105 denotes a command corresponding to System B 102 (which will be referred to hereinafter as Command B). A reference numeral 106 denotes a communication frame corresponding to System B 102 (which will be referred to hereinafter as Frame B).

Further, in the block configuration of the system connection adapter 103, a reference numeral 107 denotes a Command A transmitting and receiving means which transmits and receives Command A 104 to and from System A 101. A reference numeral 108 denotes a Command A analyzing means which receives Command A 104 which is transmitted from the Command A transmitting and receiving means 107 and then analyzing it. A reference numeral 109 denotes a command conversion means which converts Command A 104 and Command B 106 from one to the other. A reference numeral 110 denotes a frame encapsulation and decapsulation means which receives a command transmitted from the Command A analyzing means 108 and then encapsulating it in Frame B 106, or reversely, for decapsulating Frame B 106 encapsulated to extract the command. A reference numeral 111 denotes a Command B transmitting and receiving means which transmits and receives Command B 105 to and from System B 102. A reference numeral 112 denotes a Frame B transmitting and receiving means which transmits and receives a communication frame corresponding to System B 102. A reference numeral 113 denotes an intersystem command correspondence memorizing means.

With referring to FIGS. 3(*a*) and (*b*), a reference numeral 301 denotes a frame header corresponding to System B 102 (which will be referred to hereinafter as Frame Header B). With referring to the block diagram of FIG. 4, a reference numeral 401 denotes a device which is connected on the side of System B (which will be referred to hereinafter as a terminal device). A reference numeral 402 denotes a Command B transmitting and receiving means. A reference numeral 403 denotes a Command B processing section. A reference numeral 404 denotes a Frame B transmitting and receiving means. A reference numeral 405 denotes a frame encapsulation and decapsulation means. A reference numeral 406 denotes a Command A processing section. Further, with reference to FIGS. 5 (*a*), (*b*), and (*c*), a reference numeral 501 denotes an open system. A reference numeral 502 denotes a system connection adapter. A reference numeral 503 denotes an existing system.

An operation of the system connection adapter 103 is now explained with reference to FIG. 1, FIG. 2, and FIG. 3.

Firstly, the explanation is given in the case where a command is transmitted to System B 102 from System A 101.

Command A 104 transmitted to the system connection adapter 103 from System A 101 is received by the Command A transmitting and receiving means 107, and then passed to the Command A analyzing means 108.

Now, with reference to the flow chart illustrated in FIG. 2, a processing procedure of Command A 104 by the Command A analyzing means 108 is explained.

Command A 104, after being passed to the Command A analyzing means 107, is interpreted of its command type. Then, it is judged with reference to the intersystem command correspondence memorizing means 113 whether or not the command type has a correspondence to that of Command B 105.

If it is judged that the command type has a correspondence to that of Command B 105 of System B, then Command A 104 is transmitted to the command conversion means 109.

To the contrary, if it is judged that the command type has no correspondence to that of Command B 105, then Command A 104 arrived is transmitted to the frame encapsulation and decapsulation means 110.

In this manner, Command A 104 is sorted and then passed either to the command conversion means 109 or to the frame encapsulation and decapsulation means 110.

With Command A 104 being passed to the command conversion means 109, the whole command thereof is interpreted and then converted into Command B 105 with reference again to the intersystem command correspondence memorizing means 113. Command B 105 converted is transmitted to System B 102 by way of the Command B transmitting and receiving means 111.

In this manner, Command A 104 is converted into Command B 105 to be transmitted to System B 102.

Further, Command A 104, after being passed to the frame encapsulation and decapsulation means 110, as shown in FIG. 3(*a*), is added with Frame Header B 301 to generate Frame B 106.

Frame B 106 generated is transmitted to System B 102 by way of the Frame B transmitting and receiving means 112. In this manner, Command A 104 is encapsulated in its original form in Frame B 106 and then transmitted.

The explanation is now given in the case where a command is transmitted to the side of System A 101 from the side of System B 102.

In the case where Command B 105 is transmitted to System A 101 from System B 102, Command B 105 is transmitted to the system connection adapter 103 from System B 102, firstly.

In the system connection adapter 103, the Command B transmitting and receiving means 112 receives Command B 105 and passes it to the command conversion means 109.

The command conversion means 109 interprets the whole command of Command B 105 received and converts the command into Command A 104 with reference to the intersystem command correspondence memorizing means 113. Command A 104 converted is transmitted to System A 101 by way of the Command A transmitting and receiving means 107.

Further, in the case where Command A 104 being encapsulated by Frame B 106 is transmitted to the system connection adapter 103 from System B 102, the encapsulated Command A 104 is received firstly by the Frame B transmitting and receiving means 112, and then passed to the frame encapsulation and decapsulation means 110.

At this stage, the frame encapsulation and decapsulation means 110, as shown in FIG. 3(*b*), removes Frame Header B 301 from Frame B 106, and extracts Command A 104 in Frame B 106. Command A 104 extracted is transmitted to System A 101 by way of the Command A transmitting and receiving means 107. In this manner, Command B 105 and Frame B 106 are transmitted to System A 101 by way of the system connection adapter 103.

Further, System B 102, which is interconnected with other systems by means of the system connection adapter 103 discussed above, may alternatively be connected with a terminal device which is equipped additionally with a function to process Command A 104 other than the function to process Command B 105. This allows the system to handle a maker's original function. As a result, this terminal device 401 allows the maker to establish predominance over other open devices.

The above mentioned point is now explained with reference to the block configuration shown in FIG. 4.

Firstly, Command B 105, after being transmitted from the system connection adapter 103, reaches the Command B processing section 403, where to be interpreted, by way of the Command B transmitting and receiving means 402. Command B 105, after being generated in the Command B processing section 403, is then transmitted to the system connection adapter 103 following a reverse course.

Similarly, Frame B 106, after being transmitted from the system connection adapter 103, reaches the frame encapsulation and decapsulation means 405, where to be decapsulated to extract Command A 104, by way of the Frame B transmitting and receiving means 404. Command A 104 extracted is interpreted in the Command A processing section 406. Command A 104, after being generated in the Command A processing section 406, is encapsulated in Frame B 106 by the frame encapsulation and decapsulation means 405, and then transmitted to the system connection adapter 103 following a reverse course.

In this manner, Command A 104 encapsulated by Command B 105 or Frame B 106 is processed through the system connection adapter 103.

Since the system connection adapter 103 according to the present invention is configured as discussed above, a conventional command, which is the original of System A 101, and therefore not specified in the open system B 102 and has no correspondence available to the open system B 102, is added with Frame Header B 301 by the frame encapsulation and decapsulation means, and then transmitted in its original form. For this, the terminal device 401, which is connected on the side of System B, is provided with the function to extract Command A 104 from Frame B 106 transmitted, and interpret it to be processed. For that reason, even if it is newly developed and added by a maker, the function is allowed to be handled on the open System B. As a result, this allows for ease in expanding functions.

Further, with reference to the figures, separate interfaces are provided for Command B 105 and Frame B 106 on the side of System B 102. Alternatively, however, a single interface may be provided instead so that the separation may be achieved through signal processing.

Still alternatively, with further reference to the mode of connecting an open system and an existing system by means of the system connection adapter, as shown in FIG. 5(*a*), the system connection adapter may be provided for each of a variety of existing systems. This mode of connection allows for ease in expanding a system function. As a result, a complicated system may be made up simply, thereby contributing to system making up methods.

Still more alternatively, as shown in (b) of the same figure, a single unit of the system connection adapter may be used for handling a single open system and two or more existing systems. Still more, as shown in (c) of the same figure, it is also possible to connect two or more open systems and two or more existing systems by a single unit of the system connection adapter. It is to be noted, however, that the modes of connection are not limited to those introduced above.

INDUSTRIAL APPLICABILITY

Since the system connection adapter 103 and the terminal device 401 according to the present invention, thus being configured, may have the following effects.

Even the original command of System A, which is not specified in the open System B 102 and has no correspondence available, is allowed to be handled, for being encapsulated to be transmitted or extracted through the decapsulation by the frame encapsulation and decapsulation means. As a result, commands may be exchanged between system A and System B with each other.

Further, the terminal device which is connected to System B is provided with the means of extracting Command A from Frame B and interpreting it, and reversely, generating Command A and encapsulating it in Frame B. This allows even the original operation of System A to be handled (executed) in System B.

This allows for ease in developing system products with maker's original functions being added. In addition to that, this also allows for ease in expanding functions.

What is claimed is:

1. A system connection adapter, comprising:

a command A transmitting and receiving means which transmits and receives a command A relating to a system A;

a command B transmitting and receiving means which transmits and receives a command B relating to a system B which is made up by using a protocol different from a protocol used by the system A;

a frame B transmitting and receiving means which transmits and receives a communication frame B relating to the system B;

an intersystem command correspondence memorizing means which memorizes correspondence relation between the command A and the command B;

a command A analyzing means which analyzes the command A from the command A transmitting and receiving means, and judges, with reference to the intersystem command correspondence memorizing means, whether to establish a correspondence between the command A and the command B;

a command conversion means which establishes, with reference to either one of a judgement result by the command A analyzing means and the intersystem command correspondence memorizing means, the correspondence between the command A from the command A transmitting and receiving means and the command B from the command B transmitting and receiving means, and converts the command A and the command B from one to the other so as to mediate transmission and reception between the command B transmitting and receiving means and the command A transmitting and receiving means; and a frame encapsulation and decapsulation means which performs one of encapsulation and decapsulation, with reference to the judgement result by the command A analyzing means, of the communication frame B from the frame B transmitting and receiving means and the command A from the command A transmitting and receiving means so as to mediate transmission and reception between the frame B transmitting and receiving means and the command A transmitting and receiving means.

2. A terminal device which is connected to a system B in a system which is provided with a system A, the system B and a connection adapter, the system B being made up by using a protocol different from that used by the system A, and the connection adapter performing one of converting a command A relating to the system A and a command B relating to the system B from one to the other and exchanging the command A and the command B by means of encapsulating the command A in a frame B relating to the system B and extracting the command A encapsulated from the frame B, the terminal device comprising:

a command B transmitting and receiving means, which transmits and receives the command B to and from the connection adapter;

a command B processing section, which performs one of interpreting the command B and generating the command B and transmits and receives the command B to and from the command B transmitting and receiving means;

a frame B transmitting and receiving means, which transmits and receives the frame B to and from the connection adapter;

an encapsulation and decapsulation means, which performs one of encapsulating the command A into the frame B and decapsulating the frame B to extract the command A and transmits and receives the frame B to and from the frame B transmitting and receiving means; and a command A processing section, which performs one of interpreting the command A and generating the command A and transmits and receives the command A to and from the encapsulation and decapsulation means.

* * * * *